Figure 1:
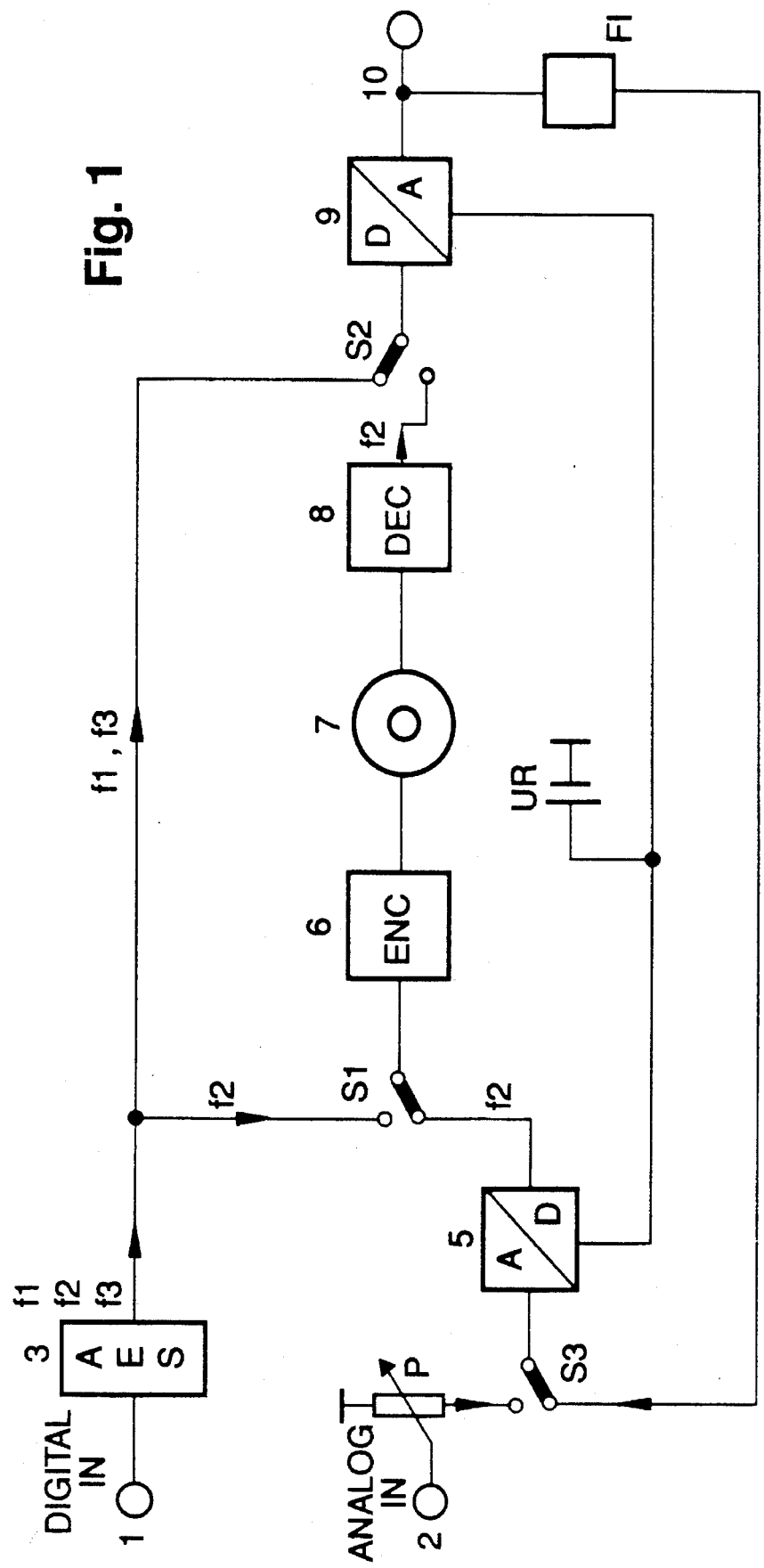

United States Patent [19]

Büchler et al.

[11] Patent Number: 5,519,395
[45] Date of Patent: May 21, 1996

[54] DIGITAL RECORDING AND REPRODUCTION DEVICE

[75] Inventors: Christian Büchler, Villingen-Schwenningen; Dietmar Uhde, Königsfeld; Friedhelm Zucker, Villingen-Schwenningen, all of Germany

[73] Assignee: Deutsche Thomson-Brandt GmbH, Villingen-Schwenningen, Germany

[21] Appl. No.: 213,895

[22] Filed: Mar. 16, 1994

[30] Foreign Application Priority Data

Mar. 18, 1993 [DE] Germany ............. 43 08 617.9

[51] Int. Cl.⁶ ............................................. H03M 1/00
[52] U.S. Cl. ................................................... 341/61
[58] Field of Search .................... 341/61, 108, 110, 341/144, 155

[56] References Cited

U.S. PATENT DOCUMENTS 4,682,251 7/1987 Hirota et al. .............. 360/33.1

FOREIGN PATENT DOCUMENTS 2223876 8/1988 United Kingdom ........... G11B 31/00

OTHER PUBLICATIONS

Sampling–Rate Conversion of Video Signals, Ajay Luthra et al. SMPTE Journal,Nov. 1991, pp. 869 to 879.
Digitale Signalverbeiung Andern der Abtastfrequenz, Funkschau 24/1985, pp. 47 & 48.
Patent Abstract of Japan: JP1253873, Tanaka Hiroshi, "Digital Signal Recording/Reproducing Device", Pub. Date: Oct. 11, 1989, vol. 14, No. 1.
Patent Abstract of Japan: JP2044575, Yoshino Tadashi, "Digital Signal Recording and Reproducing Device", Pub. Date: Feb. 14,1990, vol. 14, No. 207.
Search Report dated Nov. 21, 1995 EPO.

Primary Examiner—Brian K. Young
Attorney, Agent, or Firm—Joseph S. Tripoli; Eric P. Herrmann

[57] ABSTRACT

A digital recorder which includes an A/D converter for converting analog signal to digital form for recording and a D/A converter for converting recovered recorded digital information to analog form, includes switch circuitry for interconnecting the D/A converter and the A/D converter in a manner to perform sample rate conversion of input digital signals to condition the recorder to record digital signals having different sample rates.

10 Claims, 2 Drawing Sheets

DIGITAL RECORDING AND REPRODUCTION DEVICE

This invention ion relates to a method and an arrangement for digital recording and reproduction devices including a digital signal input for recording or converting digital signals which have different scanning frequencies, such as, for example, MOD or DAT devices.

In the digital art, the scanning frequency with which an analogue or else a digital signal is sampled is one of the most important properties of the system. It indicates how quickly the individual samples succeed each other and it is also referred to as the sampling rate or the sampling frequency. In order to capture the full information content of an analogue signal, the scanning frequency is selected to be at least twice as high as the frequency being measured in accordance with the Shannon sampling theorem which has proved itself in practice. Audio signals in the frequency range up to 20 kHz thus require a scanning frequency of 40 kHz. However, different scanning frequencies are laid down for the individual recording media and methods of transmission. Thus, for example, the scanning frequency amounts to:

44.1 kHz for the compact disc CD or mini-disc,
48 kHz for digital audio tape DAT and
32 kHz for satellite broadcasting.

Consequently, a scanning frequency convertor is required for processing digital signals of a system using a first scanning frequency, in a system which uses a second scanning frequency. Basically, two ways are available for this purpose. The digital signal is either converted into an analogue signal and scanned at the second scanning frequency or, a conversion of the scanning frequency occurs by means of a computer at the digital level.

As regards the conversion of the scanning frequency via an analogue intermediate stage, the opinion exists that this leads to a loss in quality and requires expensive D/A and A/D convertors. It is claimed in particular, that the intermediately connected analogue stages and the multiple usage of filters nullifies the essential advantages of digital signal processing, c.f. KRIEG, Bernhard: Praxis der digitalen Audiotechnik. In: Franzis-Arbeitsbuch 1989, p 33. Analogue transmission paths have a lower dynamic range compared to the digital transmission paths, despite the standardisation of the interfaces, due to the matching of the recording levels that is required and consequently, recording devices having an analogue signal input, generally have a recording level potentiometer or an automatic recording level control means available. Despite the recording level control means, the constant re-adjustment leads to a loss of dynamic range and the transmission is disadvantageously affected by stray pick-up from external signals.

On the other hand, the digital signal transmission, which is virtually insensitive to stray pick-up from external signals, requires, due to the recording and reproduction devices using different scanning frequencies, a sampling rate convertor, or digital scanning frequency convertor, in order to be able to undertake a transcription, for example from a DAT recorder to an MOD or mini-disc or from a CD to a DAT recorder, using a digital signal. The principle of linear interpolation used for the conversion of the digital scanning frequency or sampling rate requires, as is known, a heavy expenditure. The heavy expenditure for implementing a digital scanning frequency convertor results thereby, both from the ratio between the sampling rates and from the possible variants that require a lowering or a lifting of the scanning frequency.

Due to the expenditure which is necessary for a digital scanning convertor, some recording and reproduction devices have a terminal exclusively for audio signals, which terminal is also available for the recording of items of information from a microphone. Since the analogue signal transmission has sufficient known disadvantages relative to a digital signal transmission, a digital signal transmission is generally preferred especially if a digital signal source is available.

Consequently, the object of the invention is to provide a method and an arrangement for digital recording and reproduction devices including a digital signal input for recording or converting digital signals which have different scanning frequencies that can be realised at low cost.

The invention is based on the A/D and D/A convertors which are basically available in a digital recording and reproduction device being used in a special manner for forming a scanning frequency convertor so that the recording or conversion of digital signals having different scanning frequencies is made possible via a digital signal input without any additional expenditure for a scanning frequency convertor and without a digital scanning frequency convertor or sampling rate convertor. To this end, the digital signal, which differs from the scanning frequency usually used in the recording and reproduction device for the recording, is supplied to the D/A convertor available in the recording and reproduction device for the reproduction of information and the output of the D/A convertor is connected via a filter, that is adapted to the lowest scanning frequency, to the input of the A/D convertor available in the recording and reproduction device for the recording of information. The matching of the filter to the lowest scanning frequency can be implemented by switching means. Furthermore, in order not to disadvantageously affect the transmission properties visa visa digital signal transmission despite this analogue intermediate stage used for the scanning frequency conversion, a connection is provided between the differing reference voltages which determine the modulation range of the A/D or D/A convertor and which are usually generated separately in the D/A convertor and in the A/D convertor.

Dynamic losses are avoided, in particular, due to a commonly used reference voltage for the A/D and D/A convertors and the equality of their modulation ranges thereby achieved. Moreover, the A/D and D/A convertors in the recording and reproduction device can be in immediate proximity or be integrated in a circuit so that a resistance visa vis stray pick-up from external signals can likewise be ensured. The prejudice with regard to the disadvantage of using an intermediate stage which processes analogue signals can thus no longer be maintained. In advantageous manner, recording and reproduction devices can be realised which have a digital signal input for the recording of digital signals of different scanning frequency and which nevertheless use, with comparable quality of the signal transmission and signal recording, an intermediate stage that processes analogue signals and which require a substantially lower outlay. This is applicable both for recording and reproduction devices which use a disc-shaped recording medium as the storage medium and also applies for recording and reproduction devices which use tape-like recording media. Moreover, the utilisation of the first-rate quality scanning frequency conversion with an intermediate stage which processes analogue signals is also possible in connection with digital satellite broadcasting which requires a scanning frequency conversion in like manner.

The invention will be explained in detail hereinafter with the help of the drawings. ThereinFIG. 1 shows a block circuit diagram of a recording and reproduction device in accordance with the invention and FIG. 2 a block circuit diagram of a known digital recording and reproduction device.

Figure 2:
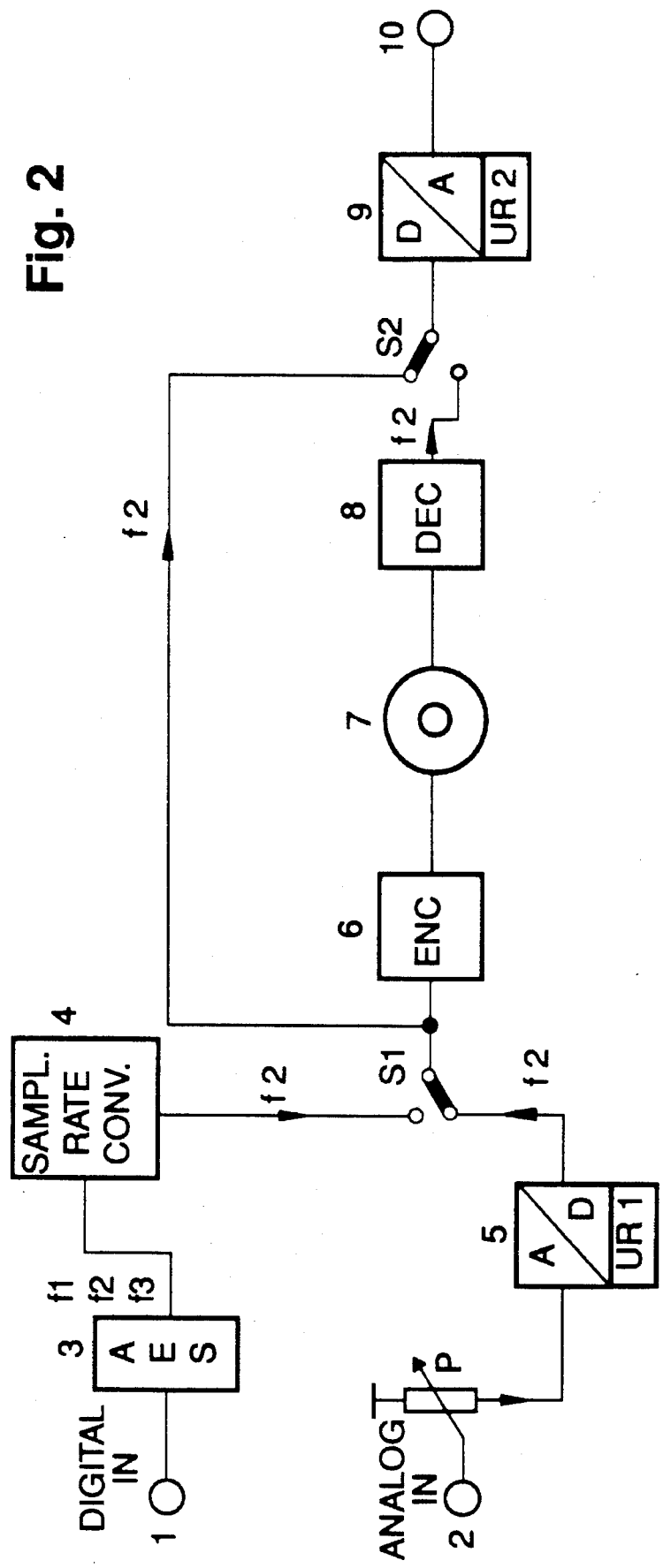

Therein, the references are used correspondingly in the FIGS. 1 and 2 so that they indicate equivalent component groups or properties.

In accordance with the block circuit diagram of a recording and reproduction device in accordance with the invention illustrated in FIG. 1, the D/A convertor 9 and A/D convertor 5 which are generally available in a digital recording and reproduction device are used in advantageous manner for the recording of digital signals of different scanning frequency via a digital signal input 1. In order to De able to record digital signals from different sources, or of different scanning frequencies, such as for example from digital broadcasts having f1=32 kHz or a DAT recorder having f3=48 kHz on a MOD for which a recording or scanning frequency of f2=44.1 kHz is used, a conversion to the sampling rate or scanning frequency f2 is required. To this end, known digital recording and reproduction devices including a digital signal input comprise a sampling rate convertor or scanning frequency convertor 4 corresponding to FIG. 2 which is connected to the AES receiver 3 forming the interface of the digital signal input 1 or they only allow the recording of digital signals from system compatible devices.

The abbreviation AES stands for Audio Engineering Society as being the standardised digital interface. The AES receiver 3 provides the corresponding scanning frequencies f1 or f2 or f3 of the digital signal at the digital signal input 1 as well as the associated quantisation signals to the scanning frequency convertor 4 and the scanning frequency convertor 4 then calculates the quantisation values for the here selected scanning frequency f2 for example, with which information signals that are also supplied to an analogue signal input 2 are processed in the digital recording and reproduction device, which values are required for the special recording and reproduction device. To this end, analogue signals at the analogue signal input 2 are supplied via a potentiometer P, which exerts an influence on the recording level, to an A/D convertor 5 which makes available for the recording, a digital output signal having the scanning frequency f2. In accordance with the analogue or digital signal source, a digital signal having the scanning frequency f2 is then supplied via a switch S1 to an encoder or to a coding device 6 for the recording onto an information carrier 7. The information carrier 7 is a magneto-optic disc MOD in the chosen example but it can also be a magnetic tape, the carrier of a transmitter signal or another carrier.

A decoder 8, which provides a digital output signal having the scanning frequency f2 via a switch S2 to a D/A convertor 9 for the reproduction at the output 10, is provided in the recording and reproduction device for the reproduction of items of information recorded on an information carrier. In particular for studio devices, the output 10 is likewise a standardised interface having a maximum output voltage of 0.775 volts. In order to ensure this value, the internal reference voltage source UR2 of the D/A convertor 9 is coupled to the maximum input voltage value which it is intended to resolve.

The switch S2 is provided in particular, so that one can listening during a recording.

The A/D convertor 5 and the D/A convertor 9 are respectively formed by an integrated circuit which each have an internal reference voltage source UR1 or UR2 for matching to a standardised input or output level c.f. Valvo Technische Information relating to the 871011, p 33; Sony Schaltkreiskatalog relating to the CX20018/CXA1144S or Informationsblatt PDS-1084A relating to the PCM 1750 of the Burr Brown Corporation, printed in the U.S.A. December, 1990. They are separately used with their internal reference voltage sources in known recording and reproduction devices, c.f. the block circuit diagram relating to R-DAT of the type DTC-12000ES from Sony.

Due to the use in accordance with the invention of the D/A convertor 9 and the A/D convertor 5 which are in any case present in every digital recording and reproduction device for the conversion of a scanning frequency f1, f3 or any other scanning frequency f into a scanning frequency f2 unique to the system, the outlay required for the recording of a digital signal is reduced and the recording of digital signals is made possible with recording and reproduction devices which, for the implementation of this function, need neither a digital scanning frequency convertor 4 nor further D/A or A/D convertors which are additional to the available D/A convertor 9 and A/D convertor 5 and which likewise represent a high outlay. To this end, in accordance with FIG. 1, the output of the D/A convertor 9 available in the recording and reproduction device is connected via a filter FI and a switch S3 to the input of the A/D convertor 5. The filter FI is matched thereby, in known manner, to the lowest of the scanning frequencies f1, f2, f3 and may, if necessary, be carried into effect in switched manner in dependence on the scanning frequency f1, f3 at the digital signal input 1. Furthermore, a reference voltage source UR which is common both to the A/D convertor 5 and to the D/A convertor 9 is used in order to ensure equality of the modulation ranges of the D/A convertor 9 and the A/D convertor 5. The overall modulation of the D/A convertor 9 must correspond to the overall modulation of the A/D convertor 5. An over modulation of the A/D convertor 5 must be absolutely avoided due to the signal distortions and loss of information associated therewith and an under modulation leads to dynamic losses. Since internally formed reference voltage sources UR1 and UR2 could lead to a divergence between the modulation ranges, despite a previously unusual equalising as a result of different drifts for example, a common reference voltage source UR is preferred in the embodiment. For achieving a quality, which corresponds to the digital scanning frequency conversion, an equality of the modulation ranges and the prevention of stray pick-up from external signals has to be ensured by whatever means whatsoever. Consequently, the preferred implementation of the A/D convertor 5 and of the D/A convertor 6 is provided in one circuit.

For the recording or conversion of a digital signal at the digital signal input 1, the digital signal is supplied in correspondence with FIG. 1 via the AES receiver 3 forming the digital interface and the switch S2 to the D/A convertor 9 which is in any case present and which forms, in advantageous manner together with the likewise available A/D convertor 5, a scanning frequency convertor having an analogue intermediate stage of exceptional quality.

The application has been explained on the basis of recording and reproduction devices for audio signals whereby, however, the application can also be transferred to other digital signals and is not limited to audio signals.

We claim:

1. A digital recording and reproduction device including a digital signal input (1) for recording or converting digital signals which have different sample rates on an information carrier (7), including an A/D converter (5) to convert analog signals for recording in digital form and a D/A converter (9) for the reproduction of recorded information, and further including circuitry for the selective interconnection of said D/A converter (9) and said A/D (5) converter for the conversion of the sample rate of a digital signal at the digital signal input (1) and further including a reference voltage source (UR) that is common to both said A/D converter (5) and said D/A converter (9) to ensure identical modulation ranges.

2. A digital recording and reproduction device including a digital signal input (1) for recording or converting digital signals which have different sample rates on an information carrier (7) and including an A/D converter (5) for the recording of analog signals in digital form and a D/A converter (9) for the reproduction of recorded information, further including a switch (S2) to selectively connect the digital signal input (1) of the recording and reproduction device to an input of said D/A converter (9), and a further switch (S3) and a filter (FI) to selectively couple an input of said A/D converter (5) to an output of said D/A converter (9) to effect conversion of the sample rate of a digital signal at the digital signal input (1), and a source of reference value for applying a common reference value to both said A/d converter and said D/A converter.

3. Digital recording and reproduction device in accordance with claim 2, characterized in that, the input of the D/A converter (9) is connected to the digital signal input (1) via an AES receiver (3) which forms a digital interface of the digital signal input (1).

4. Digital recording and reproduction device in accordance with claim 2, characterized in that, the A/D converter (5) and the D/A converter (9) are arranged in one circuit for also preventing stray pick-up from external signals.

5. Digital recording and reproduction device in accordance with claim 1, characterized in that, the information carrier (7) is a disk shaped information carrier.

6. Digital recording and reproduction device in accordance with claim 1, characterized in that, the information carrier (7) is a tape-like information carrier.

7. Digital recording and reproduction device in accordance with claim 1 characterized in that, the information carrier (7) is an information carrier signal of a transmitter transmitting digital information signals.

8. Digital recording and reproduction device in accordance with claim 2, characterized in that, the information carrier (7) is a disk shaped information carrier.

9. Digital recording and reproduction device in accordance with claim 2, characterized in that, the information carrier (7) is a tape-like information carrier.

10. Digital recording and reproduction device in accordance with claim 2 characterized in that, the information carrier (7) is an information carrier signal of a transmitter transmitting digital information signals.

* * * * *